United States Patent
Takei et al.

(10) Patent No.: US 6,929,189 B2
(45) Date of Patent: Aug. 16, 2005

(54) THERMOSTAT DEVICE AND TEMPERATURE CONTROL METHOD AND SYSTEM FOR ENGINE COOLANT

(75) Inventors: Toshiharu Takei, Kiyose (JP); Shinya Toyonaga, Kiyose (JP)

(73) Assignee: Nippon Thermostat Co., Ltd., Tokyo (JP)

( * ) Notice: Subject to any disclaimer, the term of this patent is extended or adjusted under 35 U.S.C. 154(b) by 0 days.

(21) Appl. No.: 10/448,124

(22) Filed: May 30, 2003

(65) Prior Publication Data

US 2004/0238652 A1 Dec. 2, 2004

(51) Int. Cl.[7] .................................................. F01P 7/16
(52) U.S. Cl. ..................................... 236/34.5; 236/68 B
(58) Field of Search ....................... 236/34, 34.5, 93 R, 236/93 A, 68 B, 68 C, 99 C, 99 E, 99 K

(56) References Cited

U.S. PATENT DOCUMENTS

| | | | |
|---|---|---|---|
| 2,101,369 A | * 12/1937 | Jorgensen | .................. 236/34.5 |
| 3,591,075 A | 7/1971 | Onishi | |
| 5,676,308 A | * 10/1997 | Saur | ........................... 236/34.5 |
| 6,439,467 B2 | * 8/2002 | Mabboux et al. | ........... 236/34.5 |
| 6,471,134 B2 | * 10/2002 | Chamot et al. | ............. 236/34.5 |
| 2002/0104892 A1 | 8/2002 | Suda | |

* cited by examiner

*Primary Examiner*—Harry B. Tanner
(74) *Attorney, Agent, or Firm*—Sughrue Mion, PLLC

(57) ABSTRACT

A thermostat configured to control engine coolant temperature, a coolant temperature control method and system, includes a thermoelement, arranged to open a main valve upon reaching a predetermined temperature; a heating element arranged, based on an output signal from a controller, to heat said thermoelement, the coolant flowing through the thermostat being exclusively coolant from the radiator. Further, the controller may transmit an output signal to said heating element according to an engine signal received from an engine temperature sensor arranged near the engine block to close one or more coolant flow slots arranged at the thermostat exit until a certain predetermined temperature is sensed. The output signal may be transmitted upon the engine temperature sensor sensing a predetermined temperature.

22 Claims, 4 Drawing Sheets

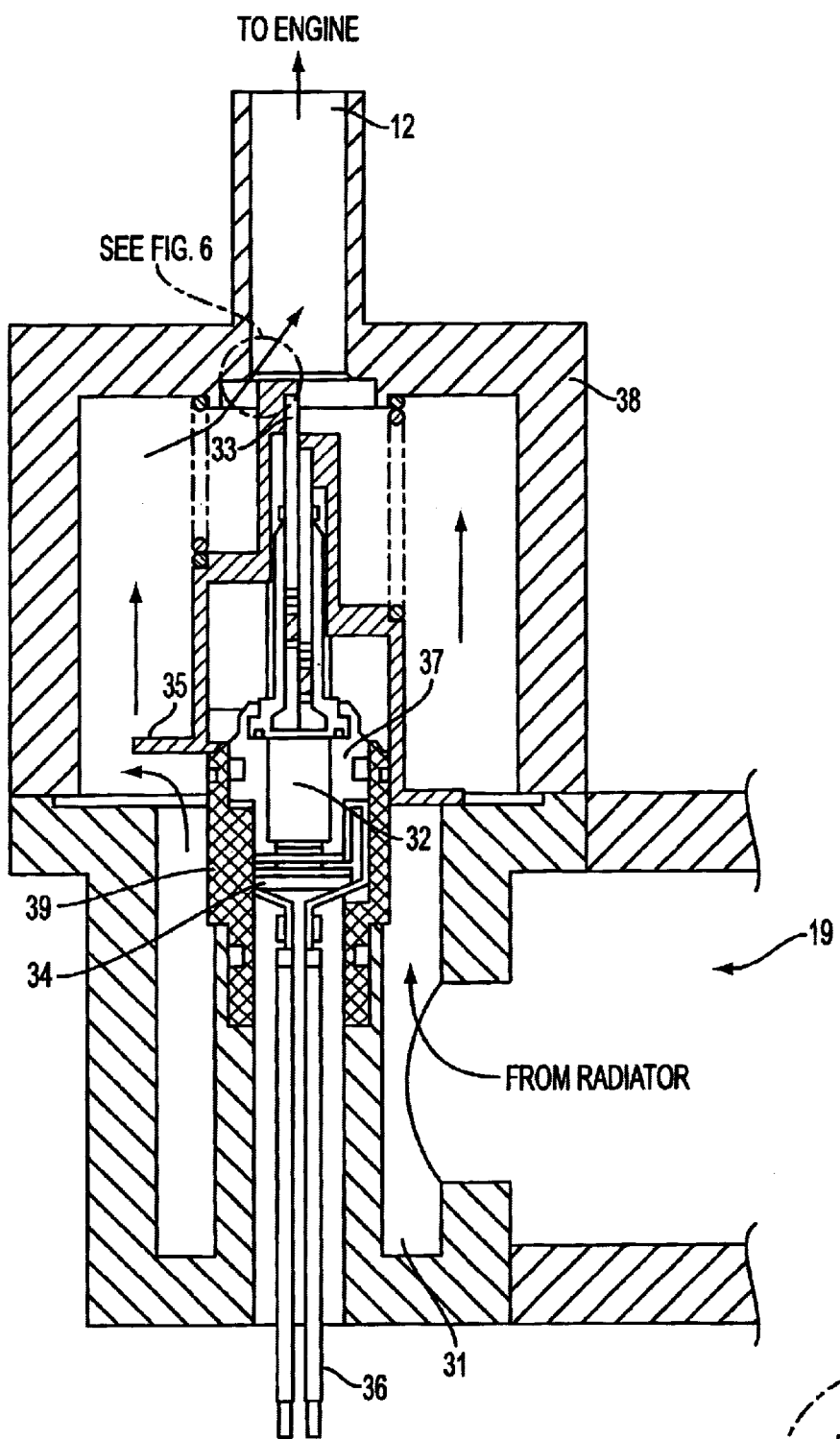
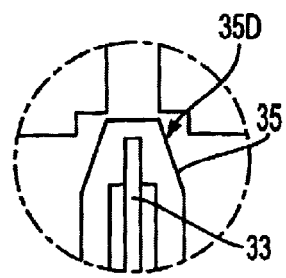
FIG. 3
FIG. 6

THERMOSTAT DEVICE AND TEMPERATURE CONTROL METHOD AND SYSTEM FOR ENGINE COOLANT

FIELD OF THE INVENTION

The present invention relates to a thermostat device, and an engine coolant temperature control method and system for an engine block. Specifically, the invention relates to arranging and controlling an engine coolant thermostat and one or more temperature sensors, which engine coolant is used to control the temperature of an engine block.

BACKGROUND OF THE INVENTION

Many types of machines and engines require a cooling system to prevent overheating. Typically, a thermostat is provided to sense the temperature of the coolant at some point in a coolant flow channel, such that when the coolant reaches a certain temperature, a main valve in the thermostat is released, allowing coolant to flow from a radiator to flow into the engine through a coolant flow channel. The coolant flow channel allows coolant to flow through the engine block and back to the radiator. If the main valve is in an open state, coolant is allowed to pass from the engine block to the radiator. A thermostat device used, for example, in an internal combustion engine or system or the like comprises a thermoelement, such as wax, which expands when sufficiently heated.

In a thermostat in a related, coolant from the engine flows into the thermostat via bypass sleeve and enters the area near where the thermoelement, typically wax, is located. When the coolant flowing through bypass sleeve reaches a pre-determined temperature, the thermoelement expands, causing the piston to be activated, which in turn opens the main valve. When the main valve is in an open state, the main flow channel is in an open state, allowing coolant from the radiator via main sleeve to enter and cool the engine.

Typically, an engine, such as an internal combustion engine, or many other types of engines, operate most efficiently at a high temperature. However, there is a ceiling temperature, which if exceeded can damage the engine, and therefore the coolant should keep the engine below this ceiling temperature.

In the conventional thermostat, when the engine is started, the coolant temperature rises and may eventually reach an optimal level. However, this often takes a long time because the main valve in the thermostat to the radiator is opened and cooler coolant is allowed to flow through the coolant flow channels to the engine block. Further, the coolant is subject to temperature dips, and therefore the engine may operate at sub-optimal temperatures. Also, in the conventional thermostat, the return of the main valve to the closed position may be unduly delayed, since the temperature of the coolant near the engine block is hotter. This causes more circulation of coolant through the radiator and cooler, and sub-optimal engine temperatures.

Also, the radiator dissipates energy in the form of heat. This energy is generally wasted. Excessive use of the radiator for cooling the coolant more than is necessary is therefore inefficient. Further, using the radiator to cool the coolant more than is necessary is inefficient because the radiator fan or other radiator cooling systems are required to work more than necessary.

SUMMARY OF THE INVENTION

A thermostat configured to control coolant temperature is contemplated, the thermostat comprising: a thermoelement, arranged to open a main valve upon reaching a pre-determined temperature, such that the main valve, when open, allows coolant to pass from a radiator to an engine block;

a heating element arranged, based on an output signal from a controller, to heat said thermoelement, wherein coolant flows to the thermostat exclusively from the radiator.

Further, in such a thermostat the controller may transmit the output signal according to an engine signal received from an engine temperature sensor arranged at the engine block.

Further, in such a thermostat, the controller may transmit the output signal upon the engine temperature sensor sensing a pre-determined block or coolant temperature.

Further, such a thermostat may be arranged near a coolant outlet of the radiator.

Further, the controller may receive inputs from at least one of a sensor near a lower tank of the radiator and a sensor arranged near a coolant outlet of the thermostat, Moreover, a method and a system accomplishing the above-described functions and setting forth other features are also contemplated.

BRIEF DESCRIPTION OF THE DRAWINGS

Aspects of illustrative, non-limiting embodiments of the present invention will become more apparent by description in detail of embodiments thereof with reference to the attached Drawings, in which:

FIG. 3 shows schematically one preferred embodiment of the thermostat, according to the invention;

FIG. 6 shows the structure of the upper portion of the valve;

DESCRIPTION OF ILLUSTRATIVE EMBODIMENTS OF THE INVENTION

Illustrative, non-limiting embodiments of the present invention overcome the disadvantages above described and offer other advantages.

Figure 1:
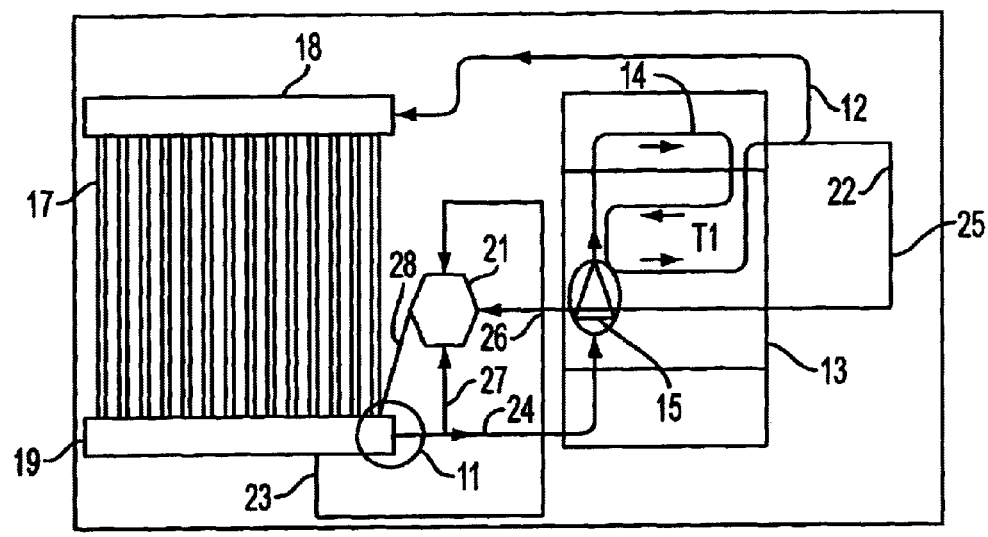
FIG. 1 shows schematically one embodiment of the engine cooling system, including the thermostat, according to the invention.

FIG. 1 shows a thermostat 11 arranged in or at the portion of the coolant flow channel 12 that is at or near the outlet of the lower tank 19 of the radiator 17. The coolant flow channel 12 continues from this point to the engine block 13 and the engine head 14. Coolant is conducted along the coolant flow channel from the radiator 17 to the engine block 13, when the main valve is in an open state, discussed below. When the main valve is in the open state, coolant passes through the coolant flow channel 12 to cool the engine block 13. An engine temperature sensor 22 located at the portion of the coolant flow channel 12 at or near the engine block 13 or the outlet from the engine block is provided to sense the temperature of the coolant in the coolant flow channel 12. The engine temperature sensor transmits a signal via line 25 to the controller 21. Additional sensors 23, 24 may be arranged on the lower radiator tank 19, and/or on the portion of the coolant flow channel between the thermostat and the engine block. One or both of the lower radiator sensor 23 and the post-thermostat sensor 24 may be provided to provide signals to the controller 21, discussed below, along lines 26 and 27, respectively.

A water pump 15 is shown at or near the portion of the coolant flow channel 12 at the engine block 13, for pressurizing the coolant flow channel 12. The coolant flow channel 12 conducts the coolant through the engine block to cool the engine block. FIG. 1 shows schematically a path of the coolant flow channel 12 through the engine block 13 and a particular location of the water pump 15, however, these may be modified in many ways within the present invention. The engine block 13 and the engine head 14 shown are not intended to include only internal combustion system engine blocks and engine heads, such as those used in motor vehicles, but also to include those used in other types of engines or machines that require coolant for cooling to prevent overheating for which the present invention is suitable.

FIG. 1 shows an engine temperature sensor 22 arranged in or near the portion of the coolant flow channel at or near the outlet of the engine block 13. It will be understood by those skilled in the art that the precise location of this temperature sensor 22 may be varied and that this temperature sensor may be located in or at other portions of the coolant flow channel at or near the engine block or at the portion of the coolant flow channel near the outlet of the engine block. The engine temperature sensor 22 transmits an engine temperature signal to the controller 21, discussed below.

Coolant conducted along the coolant flow channel from the engine block to the radiator is cooled by the radiator. FIG. 1 shows a radiator 17 with an upper tank area 18, a lower tank area 19, and fins and tubing connecting the upper and lower tanks and conducting heat away from the coolant flowing therethrough. The radiator 17 is not limited to a radiator of the type shown or to a conventional radiator, but includes other heat dissipating or cooling devices.

FIG. 3 shows schematically one preferred embodiment of the thermostat, according to the invention. FIG. 3 shows the thermostat physically adjoined to the lower radiator tank 19 and this arrangement offers certain structural advantages. However, the thermostat may also be located at various positions along the portion of the coolant flow channel that conducts coolant from the radiator to the engine block.

As shown schematically in FIG. 3, coolant from the radiator enters the thermostat through the thermostat coolant inlet 31. The thermoelement 32, often comprising wax, but not limited to wax, which is shown near the center of the thermostat, expands when the coolant conducted into the thermostat reaches a certain pre-determined temperature. When the thermoelement expands, a piston 33, shown near the center of the thermostat, is activated. The activation of the piston causes the main valve 35 to be opened (the open-state of the main valve is shown on the left-hand side of the FIG. 3). When the main valve 35 is in an open state, coolant is allowed to flow to the coolant flow channel leading to the engine block. The main valve 35 is shown in a closed state on the right-hand side of FIG. 3.

The thermoelement 32 used in the thermostat is not limited to wax. Those of ordinary skill in the art will recognize that a number of options are available for use as a thermoelement in a thermostat according to the present invention. In addition, mechanical or electronic sensors, or other types of sensors suitable to carry out the purposes of the present invention may also be used, as is well known to those of ordinary skill in the art.

The thermostat has a case 38 surrounding the thermostat and includes a sleeve 39, preferably made of resin, around the thermoelement and the PTC (positive temperature coefficient) heater 34. According to the best mode presently known to the applicant, tapering is used in the upper portion of the thermostat case near where the valve and the coolant flow channel meet, see FIG. 6.

When the coolant sensed by the thermoelement falls below a certain pre-determined temperature, the thermoelement contracts, causing the main valve 35 to be closed. When the main valve 35 is in a closed state, coolant is not conducted from the thermostat into the coolant flow channel 12 leading to the engine block.

FIG. 3 also shows a wire 36 for conducting an output signal from the controller 21 (shown in FIG. 1) to the PTC (positive temperature coefficient) heater 34 near the thermoelement 32. The output signal activates the PTC heater 34, causing the thermoelement 32 to expand and to open the main valve 35 by activating the piston 33. Thus, the controller's output signal has the effect of opening the main valve 35 even when the coolant in the thermostat has not reached the temperature at which the thermoelement 32 expands.

Figure 2:
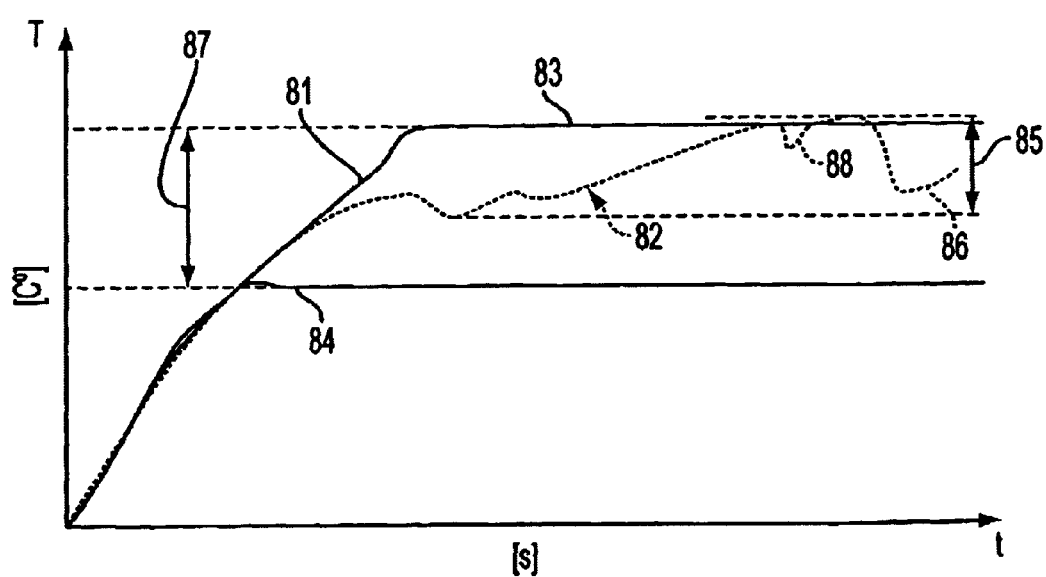
FIG. 2 shows a chart comparing performance of the thermostat according to the invention with a conventional thermostat.

FIG. 2 shows a chart comparing the performance of the thermostat according to the invention with a conventional thermostat. FIG. 2 shows the temperature of the coolant (y-axis) as a function of time (x-axis). The curve 81 shows coolant temperature according to the invention; and curve 82 shows coolant temperature as controlled by a conventional thermostat. The top most line 83 shows the higher coolant temperature at which the engine works optimally. Lines 85 and 84 represent, respectively, the lowest coolant temperature levels attained by control of the conventional thermostat and the thermostat according to the invention. Line 86 represents the conventional coolant temperature control range, and 87 represents the coolant temperature control range according to the invention.

FIG. 2 shows that, compared to a conventional thermostat, the thermostat according to the invention: (1) has a greater coolant temperature control range 87; (2) controls the coolant to reach the target coolant temperature faster; and (3) controls against dips 88 in the coolant temperature (sometimes referred to as "hunching").

Upon start-up, the engine is cooler than during operation. Unless the main valve is open, the temperature of the coolant continues to rise during operation of the engine. Maintaining the coolant temperature at the high optimal level without temperature dips also means that the engine is operating at the optimal temperature.

Although, not part of the invention, the invention may be used with a bypass flow system, such as a heating circuit, as is well known in the art.

Figure 4:
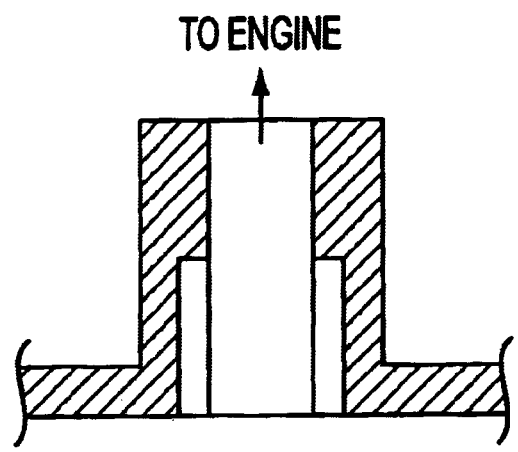
FIG. 4 shows schematically the upper portion of a thermostat case, according to one preferred embodiment of the invention.

FIG. 4 is a cross-section view showing schematically the upper portion of a thermostat case 38, where the case 38 is joined to coolant flow channel 12, according to one preferred embodiment of the invention.

Figure 5:
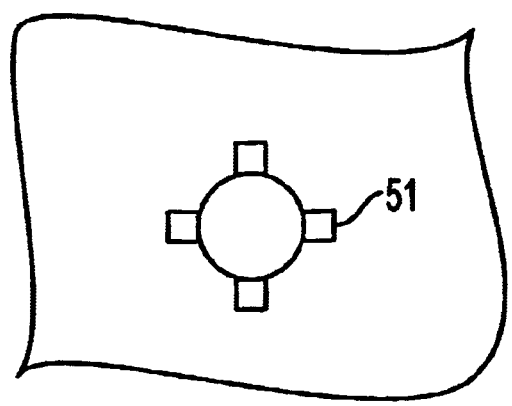
FIG. 5 is a view looking down into the thermostat from the coolant flow channel 12.

FIG. 5 is a view looking down into the thermostat from the coolant flow channel 12, which shows schematically the slots formed where the upper portion of the main valve 35 meets the coolant channel 12. One, two, three, four or more slots may thus be formed, which slots allow coolant to flow into the coolant flow channel 12.

According to a preferred embodiment of the invention, slots are provided as shown in FIG. 5. One, two, three, four or more slots may be provided, which are closed when the piston 33 is moved up all the way. The slots are open until the PTC heater is activated, when, for example, a predetermined temperature is sensed by the engine temperature sensor 22. That is, the main valve 35 is opened as the thermoelement expands in response to the surrounding coolant getting hotter. In addition, the piston 33 is caused to move up further than in normal operation by operation of the PTC heater 34 upon a control signal from the controller 21. In this way, the engine is warmed up more quickly and earlier and maintained at a higher temperature than in the conventional case until the predetermined optimal temperature is reached, at which point the control signal to the PTC heater is discontinued, allowing the thermoelement to begin to contract. This causes the piston to start to move back toward the center of the thermostat, causing the slots to start to open. Thus, coolant reaches the engine when the predetermined optimal temperature is reached.

FIG. 6 shows a preferred structure of the upper portion of the valve. The piston 33 is located inside the apparatus on the outside of which the main valve 35 is arranged. FIG. 6 shows that the top outer portion 35D of the main valve 35 is tapered at the portion that meets the coolant flow channel 12.

Figure 7:
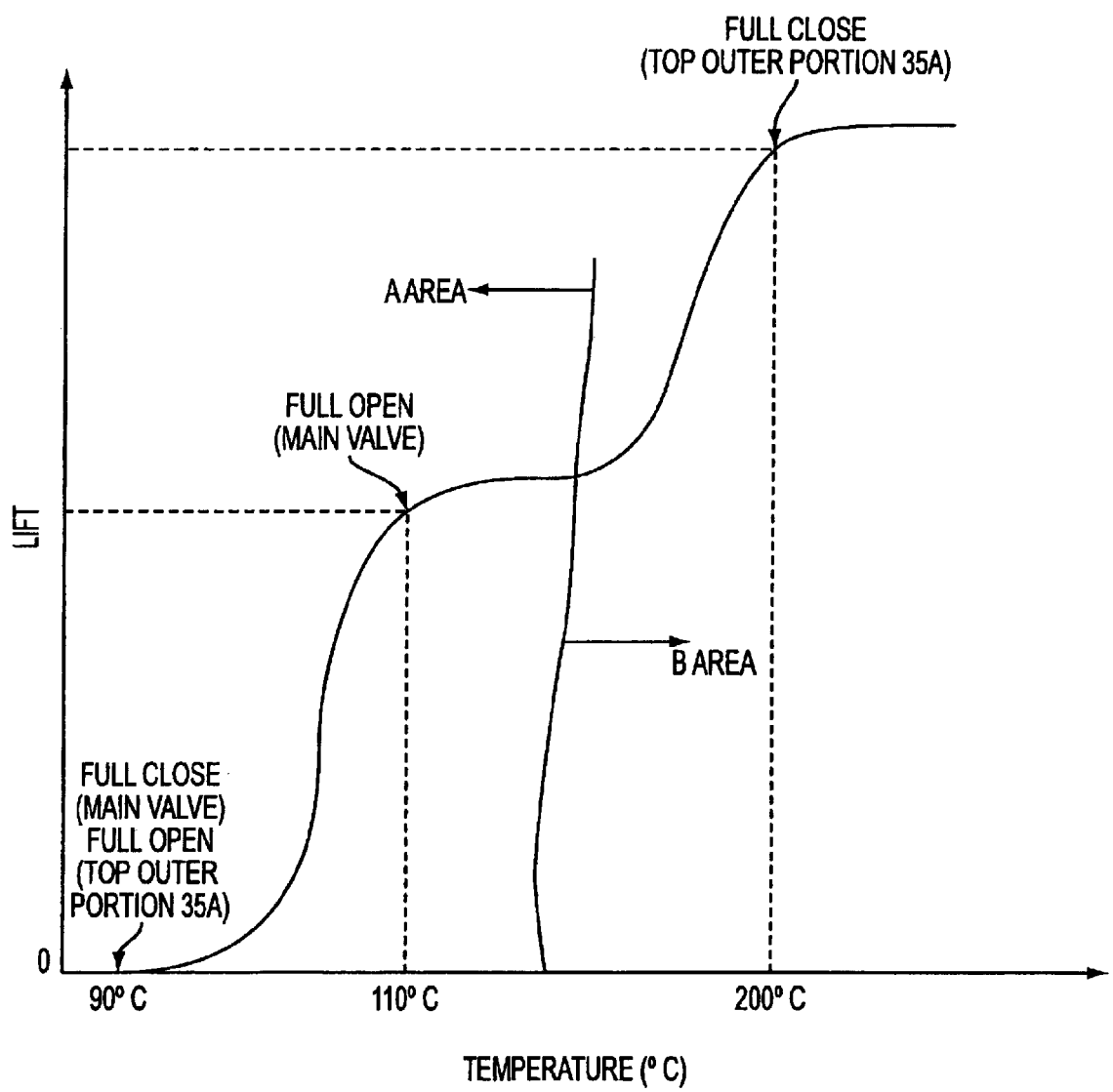
FIG. 7 is a chart illustrating temperature control of the main valve according to an exemplary, non-limiting embodiment of the present invention.

FIG. 7 is a chart showing temperature control of the main valve according to a preferred embodiment of the invention. Area A shows the temperature control range in which the thermoelement is controlled by the surrounding coolant, while Area B shows the temperature control range in which the thermoelement is controlled by the PTC heater in response to a control signal from the contoller 21. At 90 degrees Celsius, the main valve is fully closed and the slots are open. At 110 degrees Celsius, the main valve is fully open. At 200 degrees Celsius, the main valve is still fully open (in a hyperextended fashion), but the slots are fully closed as a result of further upward movement of the piston 33 toward the slots due to heating by the PTC heater under control of the controller 21.

Now an operation of the thermostat and the coolant temperature control method and system will be described referring to FIGS. 1, 3 and 6.

Typically, when the engine is started, the coolant is cool and needs no cooling to prevent engine failure. FIG. 7 shows that at the relatively cool temperature of 90 degrees Celsius, the main valve remains closed. This is because the coolant around the thermoelement 32 in the thermostat is not hot enough to cause the thermoelement to expand and the PTC heater has not been activated by a control signal from the controller 21. The engine warms and at a certain point the coolant reaches a temperature at which the thermoelement expands. FIG. 7 shows that by the time the coolant temperature reaches 110 degrees Celsius, the main valve is fully open, as a result of the expansion of the thermoelement and the corresponding up movement of the piston.

According to a preferred embodiment, when the engine temperature sensor 22 senses that the coolant has reached a certain temperature, it transmits an engine temperature signal to controller 21. Controller 21 processes the engine temperature signal and, based on that signal, transmits an output to the thermostat via output 28, which causes heating of the PTC heater 34. Accordingly, the thermoelement 32 expands further and the piston 33 is moved toward the slots, thereby closing the slots. FIG. 7 shows that at a wax temperature of 200 degrees Celsius, the slots are fully closed due to PTC heater-activated expansion of the thermoelement and corresponding up movement (movement toward the slots) of the piston. The main valve remains open.

In other words, according to this preferred embodiment, the temperature of the coolant surrounding the thermoelement gets hot enough to cause the opening of the main valve, but would typically be insufficiently hot to cause expansion of the thermoelement such that the piston is moved up enough to close the slots. Then, the further expansion of the thermoelement to close the slots requires the activation of the PTC heater under control of the controller 21. Thus, the open/close state of the slots depends on whether the PTC heater is activated under the control of the controller 21. As discussed, the controller 21 activates the PTC heater based on signals received from the engine temperature sensor. However, it is also contemplated that other temperatures, values, or other data are processed by the controller in determining whether or not to activate the PTC heater. In this way, according to this embodiment, the engine is kept at a higher temperature, increasing efficiency of operation and decreasing unnecessary radiator use.

Upon the opening of the slots of the thermostat, cooler coolant from the radiator will reach the engine block via the coolant flow channel. Overheating of the engine block thus will be prevented.

The pre-determined temperature of the preferred embodiment at which the temperature sensed at the engine temperature sensor causes the controller to cut the signal to the PTC heater in causing the thermoelement in the thermostat to contract and draw the piston away from the slots to open the slots, is advantageously set to prevent engine failure. The precise temperature settings will understood by those of ordinary skill in the art.

An additional sensor, lower radiator sensor 23, may be optionally arranged at or near the lower tank of the radiator before the inlet of the thermostat. Further, an additional sensor, post-thermometer sensor 24, may be arranged at or near the coolant channel between a coolant outlet of said thermostat and the engine block. These sensors could measure the temperature of the coolant at their respective measuring spots and transmit signals to the controller 21 via lines 26 and 27, respectively. It could thus be confirmed by the controller 21 that the main valve is open when these additional sensors transmit similar temperature readings. These sensors also confirm that the thermoelement was working properly to close the main valve at the correct pre-determined temperature.

Thus, a more efficient operation of the engine may be attained by improved control of the engine coolant temperature. A hotter and a more consistent coolant temperature may be attained, while preventing overheating of the engine block. The main valve may be opened later and may remain open for a shorter period of time. Additionally, the use of the radiator and the use of the radiator fan may be delayed or shortened. At low engine load, the coolant flow through the main valve may be delayed, causing coolant temperatures closer to optimal, and improved fuel economy.

A thermostat and temperature control method and system used to control engine coolant temperature according to the invention attains flexibility of engine layout, simplification of the coolant flow channel and streamlining of thermostat design. The cost of a thermostat or system according to the invention may be less than the cost of a full electronically operated thermostat control system.

Various modifications to these embodiments will be readily apparent to those skilled in the art, and the general principles and specific examples defined herein may be applied to other embodiments without the use of inventive faculty. For example, some or all of the features of the different embodiments discussed above may be combined into a single embodiment. Conversely, some of the features of a single embodiment discussed above may be deleted from the embodiment. Therefore, the present invention is not intended to be limited to the embodiments described herein, but is to be accorded the widest scope as defined by the limitations of the claims and equivalents thereof.

What is claimed is:

1. An engine temperature control system comprising:
   a thermostat arranged to control engine coolant flow, the thermostat disposed at an engine coolant passage conducting engine coolant from a radiator through said thermostat to an engine;
   a thermoelement located in said thermostat, the thermoelement arranged to open a main valve at a first predetermined coolant temperature, the main valve, when open, allowing engine coolant to flow from the radiator through the main valve; and
   means for effecting the opening of said valve when coolant temperature is less than said first predetermined coolant temperature,
   wherein the engine coolant passed near said thermoelement is exclusively engine coolant exiting from the radiator.

2. The system of claim 1, wherein said thermostat is arranged near an engine coolant outlet of the radiator.

3. The system of claim 1, wherein said thermostat is physically integrated into part of a lower tank of the radiator.

4. The engine temperature control system according to claim 1, wherein the thermoelement expands to open the main valve in response to a rise in temperature of the engine coolant.

5. An engine temperature control system comprising:
   a thermostat arranged to control engine coolant flow, the thermostat disposed at an engine coolant passage conducting engine coolant from a radiator through said thermostat to an engine;
   a thermoelement located in said thermostat, the thermoelement arranged to open a main valve at a first predetermined temperature, the main valve, when open, allowing engine coolant to flow from the radiator through the main valve; and
   an engine temperature sensor arranged at the engine, the engine temperature sensor configured to transmit a temperature signal to a controller; the controller configured to receive the temperature signal from said engine temperature sensor and to transmit a control signal to a heater arranged near said thermoelement upon said sensor sensing a second predetermined temperature, the second predetermined temperature being one of higher than and equal to the first predetermined temperature, the heater being configured to heat said thermoelement upon receiving the control signals,
   wherein the engine coolant passed near said thermoelement is exclusively engine coolant exiting from the radiator.

6. The system of claim 5, further comprising:
   one or more slots arranged near a coolant outlet of said thermostat, the coolant outlet conducting engine coolant from said thermostat to the engine,
   wherein said one or more slots are closed when said thermoelement is heated based on the temperature signal received by the controller, such that when said one or more slots are closed, engine coolant is not conducted through the coolant outlet of said thermostat.

7. The system of claim 6, wherein, said one or more slots are open unless the heater is activated by the control signal of the controller.

8. The system of claim 7, wherein said one or more slots are opened by said controller deactivating said heater when said engine temperature sensor senses a third predetermined temperature, the third predetermined temperature being higher than the second predetermined temperature.

9. The system of claim 5, wherein a second signal is transmitted to the controller from at least one of a sensor arranged near a lower tank of the radiator and a sensor arranged near a coolant outlet of said thermostat, and the controller transmits the control signal to the heater based at least in part on the second signal.

10. An engine coolant flow controlling thermostat comprising:
    a thermoelement located in said thermostat, the thermoelement arranged to open a main valve at a first predetermined coolant temperature, the main valve, when open, allowing engine coolant to flow from a radiator through the main valve; and
    means for effecting the opening of said valve when coolant temperature of the engine coolant is less than said first predetermined temperature,
    wherein said thermostat is arranged at an engine coolant passage conducting engine coolant from the radiator through said thermostat to an engine,
    wherein the engine coolant passed near said thermoelement is exclusively engine coolant exiting from the radiator.

11. The engine temperature control system according to claim 10, wherein the thermoelement expands to open the main valve in response to a rise in temperature of the engine coolant.

12. An engine coolant flow controlling thermostat comprising:
    a thermoelement located in said thermostat, the thermoelement arranged to open a main valve at a first predetermined temperature, the main valve, when open, allowing engine coolant to flow from a radiator through the main valve; and
    a heater arranged near said thermoelement, the heater being configured to heat said thermoelement upon receiving a control signal from a controller, the controller being configured to transmit the control signal in response to a temperature signal transmitted from an engine temperature sensor arranged at the engine reaching a second predetermined temperature, the second predetermined temperature being one of higher than and equal to the first predetermined temperature,
    wherein said thermostat is arranged at an engine coolant passage conducting engine coolant from the radiator through said thermostat to an engine,
    wherein the engine coolant passed near said thermoelement is exclusively engine coolant exiting from the radiator.

13. The thermostat of claim 12, further comprising:
    one or more slots arranged near a coolant outlet of said thermostat, the coolant outlet conducting engine coolant from said thermostat to the engine,
    wherein said one or more slots are closed when said thermoelement is heated based on the control signal received by the controller, such that when said one or more slots are closed, engine coolant is not conducted through the coolant outlet of said thermostat.

14. The thermostat of claim 13, wherein, said one or more slots are open unless said heater is activated by the control signal of the controller.

15. The thermostat of claim 14, wherein said thermostat is physically integrated into part of a lower tank of the radiator.

16. An engine temperature control method comprising:
in response to a first predetermined temperature at a thermoelement of a thermostat, opening a main valve of the thermostat, the thermostat arranged to control engine coolant flow passing from a radiator through the thermostat to an engine, the engine coolant passed near the thermoelement being exclusively engine coolant exiting from the radiator;
when the main valve is open, conducting engine coolant from the radiator through the main valve;
transmitting a temperature signal from an engine temperature sensor arranged at the engine to a controller;
transmitting a control signal from the controller to a heater arranged near the thermoelement, upon receiving a temperature signal from the engine temperature sensor indicating a second predetermined temperature, the second predetermined temperature being one of higher than and equal to the first predetermined temperature;
activating the heater and thereby heating the thermoelement, upon receiving the control signal from the controller.

17. The method of claim 16, further comprising:
closing one or more slots of the thermostat based on said activating the heater, such that when the one or more slots are closed, engine coolant is not conducted from the thermostat to the engine.

18. The method of claim 17, wherein the one or more slots are open unless the heater is activated by the control signal of the controller.

19. The method of claim 18, further comprising:
opening the one or more slots by controller deactivation of said heater, when the engine temperature sensor senses a third predetermined temperature, the third predetermined temperature being higher than the second predetermined temperature.

20. The method of claim 19, further comprising:
said one or more slots are opened by said controller deactivating said heater when said engine temperature sensor senses a third predetermined temperature, the third predetermined temperature being higher than the second predetermined temperature.

21. An engine temperature control system comprising:
a thermostat arranged to control engine coolant flow, the thermostat disposed at an engine coolant passage conducting engine coolant from a radiator through said thermostat to an engine;
a thermoelement located in said thermostat, the thermoelement arranged to open a main valve at a first predetermined coolant temperature, the main valve, when open, allowing engine coolant to flow from the radiator through the main valve; and
a heater located in said thermostat, for heating said thermoelement;
wherein the engine coolant passed near said thermoelement is exclusively engine coolant exiting from the radiator.

22. The engine temperature control system according to claim 21, wherein the thermoelement expands to open the main valve in response to a rise in temperature of the engine coolant.

* * * * *